United States Patent
Gubbins et al.

(10) Patent No.: US 10,115,423 B1
(45) Date of Patent: Oct. 30, 2018

(54) NEAR-FIELD TRANSDUCER UTILIZING ANGLED REFLECTORS

(71) Applicant: Seagate Technology LLC, Cupertino, CA (US)

(72) Inventors: Mark Anthony Gubbins, Donegal (IE); Choon How Gan, Derry (GB); Roberto Fernandez Garcia, Derry (GB); Michael James Hardy, Londonderry (GB); Andres David Barbosa Neira, Derry (GB)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/723,410

(22) Filed: Oct. 3, 2017

Related U.S. Application Data (60) Provisional application No. 62/404,319, filed on Oct. 5, 2016.

(51) Int. Cl.
| | | |
|---|---|---|
| *G11B 11/00* | (2006.01) | |
| *G11B 5/60* | (2006.01) | |
| *G11B 5/00* | (2006.01) | |
| *G11B 5/48* | (2006.01) | |

(52) U.S. Cl.
CPC .......... *G11B 5/6082* (2013.01); *G11B 5/4866* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 7,412,143 B2 | 8/2008 | Rottmayer et al. | |
| 7,599,277 B1 | 10/2009 | Kato et al. | |
| 7,957,099 B2 | 6/2011 | Tanaka et al. | |
| 8,248,891 B2* | 8/2012 | Lee | G11B 5/314 |
| | | | 369/13.33 |
| 8,339,740 B2 | 12/2012 | Zou et al. | |
| 8,576,673 B2 | 11/2013 | Ostrowski et al. | |
| 8,958,271 B1* | 2/2015 | Peng | G11B 5/314 |
| | | | 369/13.13 |
| 9,911,441 B1* | 3/2018 | Jandric | G11B 5/4866 |
| 2003/0112542 A1 | 6/2003 | Rettner et al. | |
| 2011/0096639 A1 | 4/2011 | Matsumoto | |
| 2011/0122737 A1 | 5/2011 | Shimazawa et al. | |
| 2011/0149426 A1 | 6/2011 | Araki et al. | |
| 2011/0216635 A1* | 9/2011 | Matsumoto | G11B 5/105 |
| | | | 369/13.33 |
| 2012/0039155 A1* | 2/2012 | Peng | G11B 5/314 |
| | | | 369/13.14 |

(Continued)

*Primary Examiner* — Tan X Dinh
(74) *Attorney, Agent, or Firm* — Hollingsworth Davis, LLC (57) ABSTRACT

A near-field transducer has an enlarged portion with a peg extending towards a media-facing surface. Two reflectors are located co-planar with near-field transducer and located on either side of the near-field transducer in a crosstrack direction. The two reflectors are separated by a gap proximate the peg of the near-field transducer. The two reflectors each include a first edge at the media facing surface and a second edge at an acute angle to the media-facing surface. The second edge faces the near-field transducer. The two reflectors concentrate the light on the peg of the near-field transducer.

20 Claims, 5 Drawing Sheets

(56) References Cited

U.S. PATENT DOCUMENTS

| | | | |
|---|---|---|---|
| 2012/0072931 A1 | 3/2012 | Imada et al. | |
| 2013/0064051 A1* | 3/2013 | Peng | G11B 5/3133 369/13.33 |
| 2013/0100783 A1* | 4/2013 | Ostrowski | G11B 5/1278 369/13.33 |
| 2013/0170332 A1* | 7/2013 | Gao | G11B 5/314 369/13.33 |
| 2013/0258825 A1* | 10/2013 | Seigler | G11B 5/02 369/13.33 |
| 2013/0279035 A1* | 10/2013 | Peng | G02B 5/10 369/13.33 |
| 2014/0254336 A1* | 9/2014 | Jandric | G02B 6/1226 369/13.33 |
| 2014/0376348 A1* | 12/2014 | Cheng | G11B 5/3106 369/13.33 |
| 2015/0170675 A1 | 6/2015 | Shimazawa et al. | |
| 2015/0179197 A1 | 6/2015 | Clinton et al. | |
| 2015/0325261 A1 | 11/2015 | Yang et al. | |
| 2015/0340051 A1* | 11/2015 | Tatah | G11B 5/4866 369/13.33 |
| 2016/0133286 A1* | 5/2016 | Lee | G11B 5/3133 369/13.33 |
| 2017/0249962 A1* | 8/2017 | Peng | G11B 5/4866 |
| 2018/0096702 A1* | 4/2018 | Staffaroni | G11B 5/4866 |

\* cited by examiner

| Case | Using reflectors | NPS (nm) | wPeg (nm) | hPeg (nm) | lPeg (nm) | Peg Matl |
|---|---|---|---|---|---|---|
| 1 | Yes | 40 | 35 | 30 | 22 | Au |
| 2 | Yes | 15 | 35 | 30 | 22 | Au |
| 3 | No | 40 | 30 | 20 | 25 | Rh |
| 4 | No | 15 | 30 | 20 | 25 | Rh |

*FIG. 7*

| Case | $\alpha_0$ (nm) | TGD (K/nm) | TGC (K/nm) | Tmedia_max (°C) | Thead_max (°C) | Preq (mW) |
|---|---|---|---|---|---|---|
| 1 | 30.57 | 10.09 | 10.73 | 489.6 | 99.96 | 3.07 |
| 2 | 6.98 | 11.04 | 10.24 | 480.5 | 123.7 | 3.69 |
| 3 | 56.94 | 8.97 | 8.03 | 496.1 | 151.9 | 3.51 |
| 4 | 33.8 | 9.29 | 7.27 | 490.9 | 148 | 3.58 |

NEAR-FIELD TRANSDUCER UTILIZING ANGLED REFLECTORS

RELATED PATENT DOCUMENTS

This application claims the benefit of Provisional Patent Application No. 62/404,319 filed on Oct. 5, 2016, which is incorporated herein by reference in its entirety.

SUMMARY

The present disclosure is directed to a near-field transducer that utilizes angled reflectors. In one embodiment, a near-field transducer includes an enlarged portion with a peg extending from the enlarged portion towards a media-facing surface. Two reflectors are located co-planar with near-field transducer and located on either side of the near-field transducer in a crosstrack direction. The two reflectors are separated by a gap proximate the peg of the near-field transducer. The two reflectors each include a first edge at the media facing surface and a second edge at an acute angle to the media-facing surface. The second edge faces the near-field transducer. A waveguide couples light to the near-field transducer to form a hot spot on a recording medium. The two reflectors concentrate the light on the peg of the near-field transducer.

In another embodiment, a near-field transducer has an enlarged portion with a peg extending from the enlarged portion towards a media-facing surface. Two triangular reflectors are located on either side of the near-field transducer in a crosstrack direction. The two reflectors separated by a gap proximate the peg of the near-field transducer. The two triangular reflectors each have a hypotenuse that faces the near-field transducer. A write pole is located downtrack from the near-field transducer. An optical shield is located downtrack from the near-field transducer. The optical shield has a slanted surface that faces the near-field transducer and increases a downtrack distance between the optical shield and the near-field transducer away from the media-facing surface. A channel waveguide extends to the optical shield. The channel waveguide couples light to the near-field transducer to form a hot spot on a recording medium. The two reflectors concentrate the light on the peg of the near-field transducer.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, information bits are recorded in a storage layer of a recording medium (e.g., magnetic disk) at elevated temperatures. The heated area (e.g., hot spot) in the storage layer determines the data bit dimension. One way to achieve a tiny, confined hot spot is to use a recording head with an optical near-field transducer (NFT), such as a plasmonic optical antenna or an aperture, integrated in an optical waveguide of high contrast in the index of refraction between the waveguide core and its claddings. A magnetic write pole is placed in close proximity (e.g., 20-50 nm) to the NFT at the media-facing surface of the recording head.

In the following disclosure, apparatuses (e.g., HAMR read/write heads) are described with features that may be used with an NFT that improves performance. For example, reflectors may be located co-planar and on either side of an NFT. The reflectors are separated by a gap proximate a peg of the NFT. The two reflectors each include a first edge at the media facing surface and a second edge facing the near-field transducer. The second edge is at an acute angle to the media-facing surface. The reflectors allow electromagnetic energy to be tapered to a region just below the peg of the NFT. The second edges may be beveled, which further tapers electromagnetic fields upwards, and helps to shift a heated spot towards the write pole.

Figure 1:
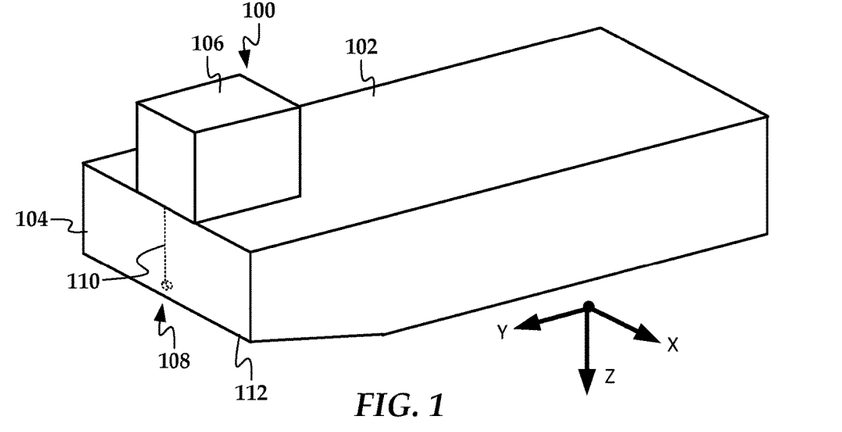
FIG. 1 is a perspective view of a slider assembly according to an example embodiment.

In reference now to FIG. 1, a perspective view shows a read/write head 100 according to an example embodiment. The read/write head 100 may be used in a magnetic data storage device, e.g., HAMR hard disk drive. The read/write head 100 may also be referred to herein interchangeably as a slider, write head, read head, recording head, etc. The read/write head 100 has a slider body 102 with read/write transducers at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducer 108. These components include an energy source 106 (e.g., laser diode) and a waveguide 110. The waveguide 110 delivers electromagnetic energy from the energy source 106 to an NFT that is part of the read/write transducers 108. The NFT achieves surface plasmon resonance and directs the energy out of a media-facing surface 112 to create a small hot spot on the recording medium.

Figure 2:
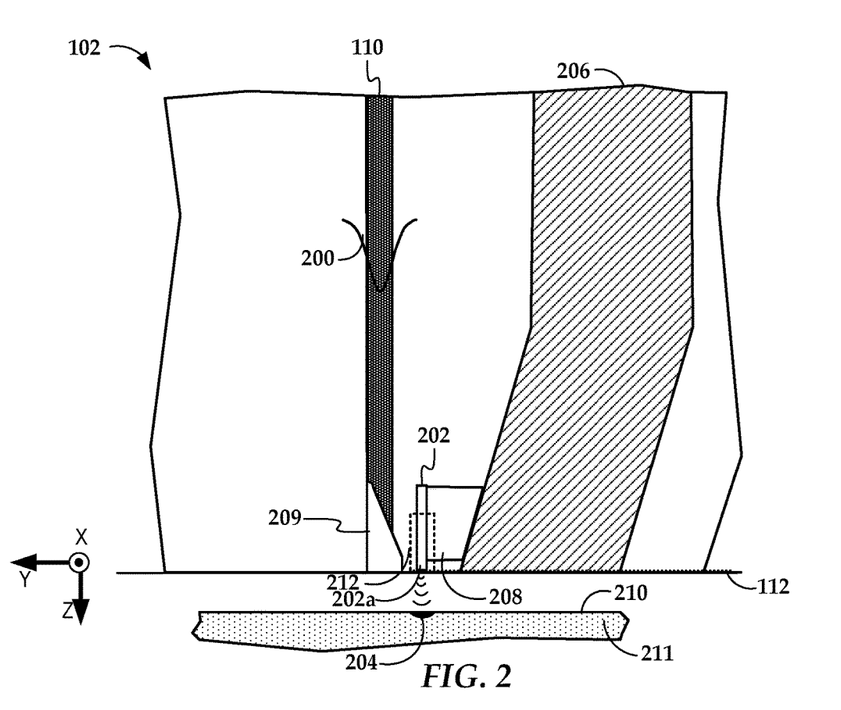
FIG. 2 is a cross-sectional view of a slider according to according to an example embodiment.

As shown in FIG. 2, the waveguide 110 receives electromagnetic energy 200 from the energy source, the energy being coupled to NFT 202. The NFT 202 is made of a metal (e.g., gold, silver, copper, etc.) that achieves surface plasmonic resonance in response to the applied energy 200. The NFT 202 shapes and transmits the energy via a peg 202a to create a small hotspot 204 on a surface 210 of a recording medium 211. A magnetic write pole 206 causes changes in magnetic flux near the media-facing surface 112 in response to an applied current. Flux from the write pole 206 changes a magnetic orientation of the hotspot 204 as it moves past the write pole 206 in the downtrack direction (y-direction). An optical shield 209 blocks stray light from reaching the recording medium 211, thereby increasing thermal gradient at the hotspot 204.

Figure 3:
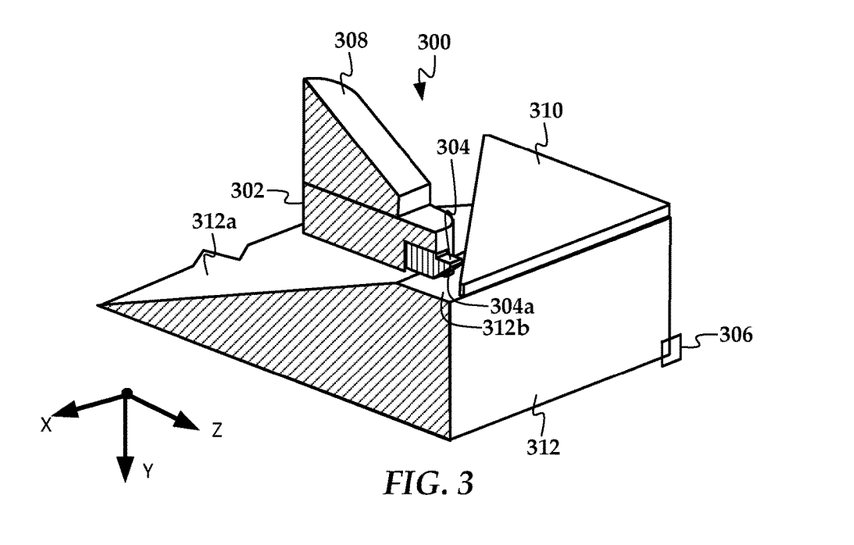
FIG. 3 is a perspective cutaway view of an apparatus according to an example embodiment.

As indicated by dashed lines 212, a pair of reflectors are positioned near the NFT 202, offset from the NFT 202 in a cross-track direction. In FIG. 3, a perspective, cutaway view shows details of reflectors used in an apparatus according to an example embodiment. The components in FIG. 3 are cut along a plane is normal to the recording medium (not shown) and extends in a downtrack direction through the center of an NFT 300. The NFT 300 includes an enlarged portion 302 with a peg 304 extending from the enlarged portion 302 towards a media-facing surface 306. The outline of enlarged portion 302 is in the shape of an elongated rectangle with rounded ends, also referred to as a stadium or capsule shape. An end of the peg 304 facing the media-facing surface 306 may have a bevel 304a at an acute angle to the media facing surface 306. The bevel 304a faces a downtrack direction (y-direction in this view) and away from a write pole (not shown in this figure; see, e.g., write pole 206 in FIG. 2).

The peg 304 and enlarged portion 302 may be made from the same or different materials. Example NFT materials include Au, Ag, Cu, Rh, Pt, Ir, etc. A heat sink 308 also extends from one side of the enlarged portion 302. The slanted top side of the heat sink 308 faces the write pole. The write pole has a slant as it approaches the media-facing surface 306, and the slanted surface of the heat sink 308 conducts heat to the write pole proximate the slant. The heat sink 308 may be made from the same or different materials as the rest of the NFT 300. Generally, a material with good thermal conductivity (e.g., gold) is preferred.

A reflector 310 is located co-planar (or approximately so) with NFT 300 and offset to one side of the NFT 300 in a cross-track direction (x-direction). The reflector 310 is triangular (e.g., a right triangle) with a hypotenuse facing the NFT 300. The reflector 310 can be made from the same material as the NFT 300, e.g., a good optical reflector such as Au or Ag. As seen in the top view of FIG. 4, the apparatus includes a second reflector 311 that is a mirror image about the yz-plane of reflector 310. The two reflectors 310, 311 are separated by a gap 400 proximate the peg 304 of the near-field transducer 300. In one embodiment, the gap 400 has a crosstrack dimension (x-direction) approximately equal to half that of the peg 304. The two reflectors 310 each have first edges 310a, 311a at the media-facing surface 306 and second edges 310b, 311b at an acute angle 402, 403 to the media-facing surface 306. The second edges 310b, 311b face the near-field transducer 300.

Figure 4:
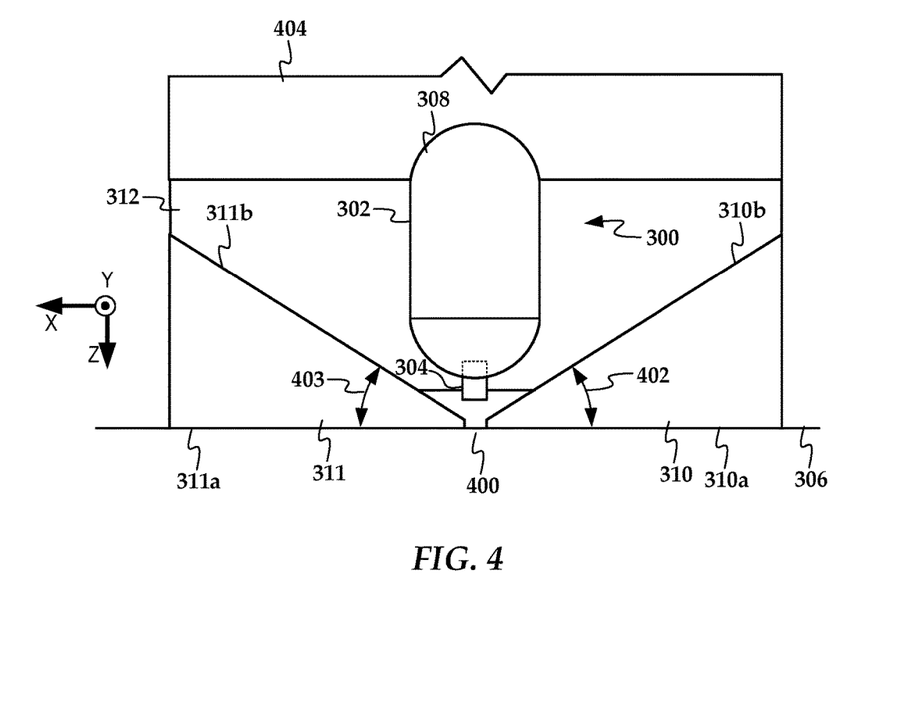
FIG. 4 is a top view of the apparatus shown in FIG. 3.

Referring again to FIG. 3, an optical shield 312 is shown downtrack from the NFT 300 and the reflectors 310, 311. The optical shield 312 extends from the media-facing surface 306 towards the end of a channel waveguide 404, which is shown in FIG. 4 and in the side view of FIG. 5. The optical shield 312 has a slanted surface 312a that faces the enlarged portion 302 of the NFT 300. The slanted surface 312a increases a downtrack distance between the optical shield 312 and the NFT 300 away from the media-facing surface 306. The optical shield 312 has a surface 312b normal to the media-facing surface 306 and that overlaps the peg 304 of the NFT 300. Generally, the optical shield 312 is formed of a material (e.g., gold) that blocks stray light from reaching the media surface, thereby increasing the thermal gradient of the hotspot formed by the NFT 300.

The channel waveguide 404 delivers light to the NFT in a fundamental transverse magnetic mode (e.g., $TM_{00}$). The optical shield 310 helps increase thermal gradient at the hotspot on the media, thereby ensuring sharp magnetic transitions. The reflectors 310, 311 allow electromagnetic energy to be tapered to a region just below the peg 304. The bevel 304a of the peg 304 further tapers electromagnetic fields upwards and helps to shift the heat spot towards the write pole 500 (seen in FIG. 5).

Figure 5:
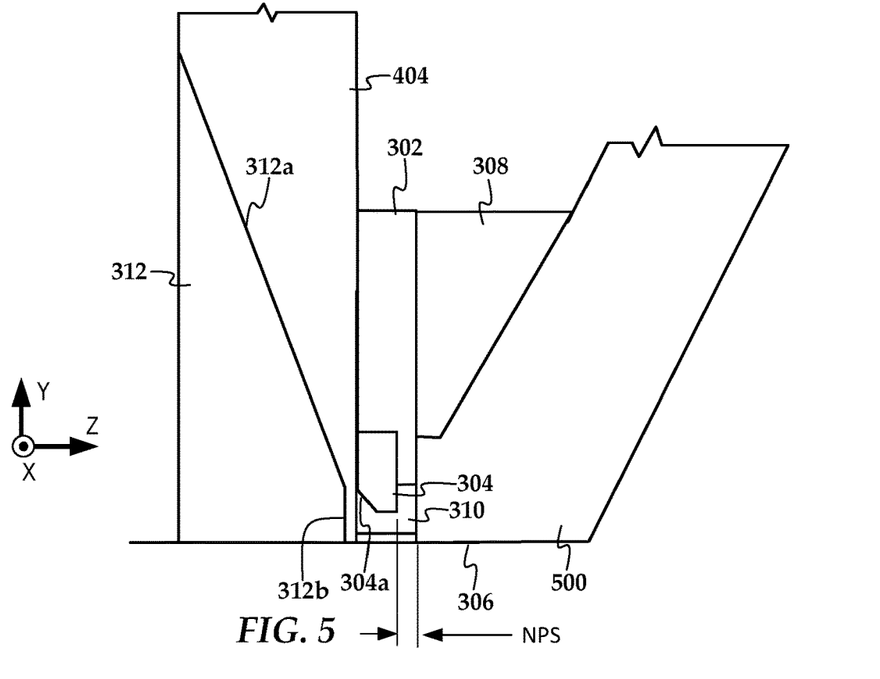
FIG. 5 is a side view of the apparatus shown in FIGS. 3 and 4.
Figure 6:
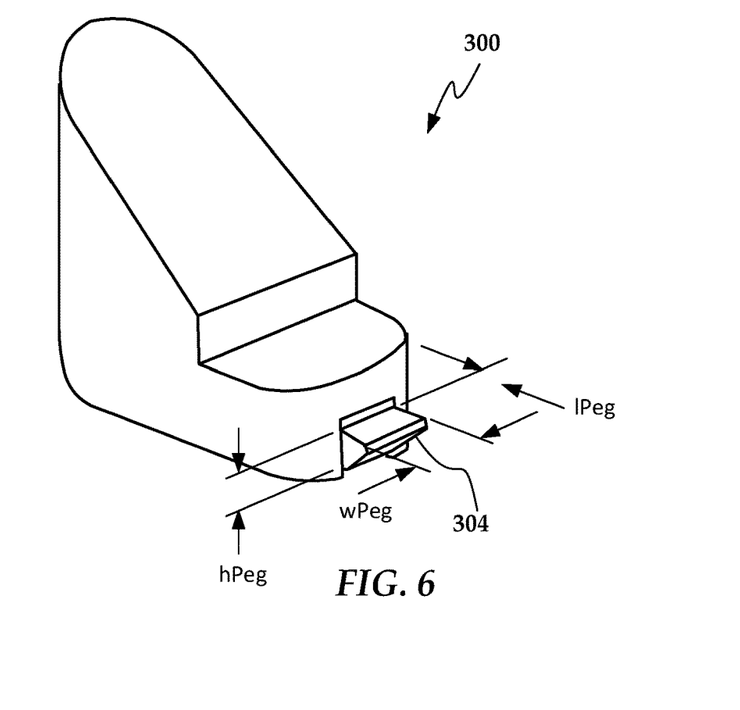
FIG. 6 is a perspective view of a near-field transducer according to an example embodiment
Figure 7:
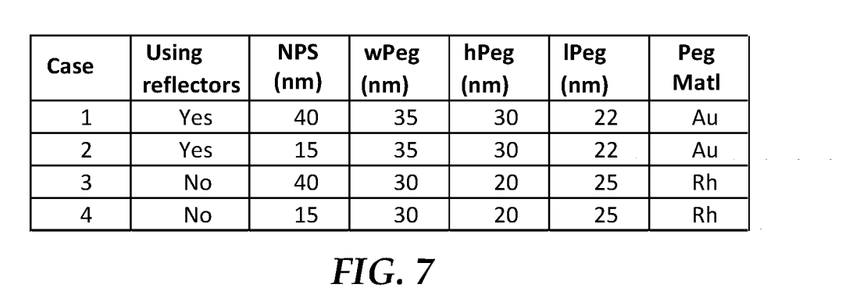
FIGS. 7 and 8 are tables showing parameters and results of an analysis of an example embodiment.
Figure 8:
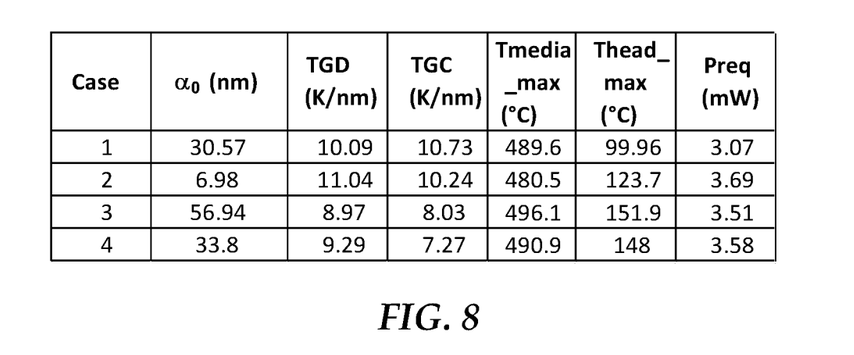

An analysis was done on the configuration shown in FIGS. 3-5 and compared to a similar configuration without the reflectors. In FIG. 7, a table shows the parameters used for different cases. Note that cases 1 and 2 (with reflectors), are obtained using illumination at a fundamental transverse magnetic mode ($TM_{00}$) in the waveguide. Cases 3 and 4 (without reflectors) are obtained for illumination with a higher order transverse electric mode ($TE_{10}$) in the waveguide. The dimensions in the table of FIG. 7 are shown in the side and perspective views of the NFT 300 in FIGS. 5 and 6. In FIG. 8, a table shows various metrics obtained from the analysis. The metrics are explained in Table 1 below. As seen in FIG. 8, the use of reflectors in cases 1 and 2 moves the hotspot closer to the write pole and increases thermal gradient in both downtrack and crosstrack directions. The higher thermal gradient for the resulting from the use of the reflectors is due to confinement of the short-range surface plasmon polaritons around the peg. Additionally, adding a bevel to the peg shifts the heat spot towards to the write pole.

TABLE 1

| Term | Explanation |
| --- | --- |
| $\alpha_0$ | Shortest distance in nm between 405° C. contour of the hot spot and the write pole |
| TGD | Downtrack thermal gradient of hotspot in K/nm |
| TGC | Crosstrack thermal gradient of hotspot in K/nm |
| Tmedia_max | Maximum temperature at the hotspot, in ° C. |
| Thead_max | Maximum temperature at the hotspot, in ° C. |
| Preq | Laser power required, in mW |

Figure 9:
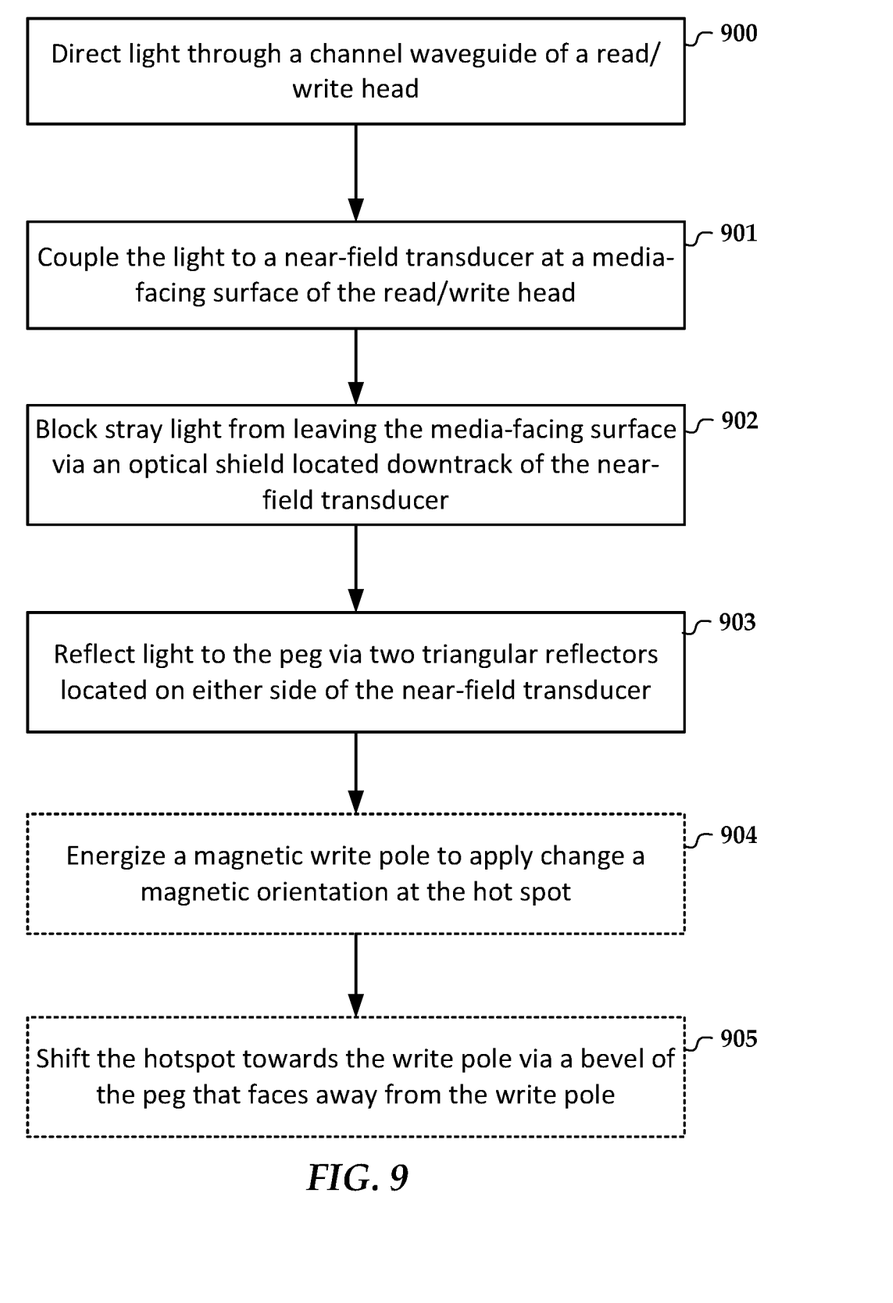
FIG. 9 is a flowchart of a method according to an example embodiment.

In FIG. 9, a flowchart shows a method according to an example embodiment. The method involves directing 900 light through a channel waveguide of a read/write head. The light is coupled 901 to a near-field transducer at a media-facing surface of the read/write head. The near-field transducer includes a peg that directs surface plasmons from the media-facing surface to heat a recording medium. Stray light is blocked 902 from leaving the media-facing surface via an optical shield located downtrack of the near-field transducer.

Light is reflected 903 back to the peg via two triangular reflectors located on either side of the near-field transducer in a crosstrack direction. The two reflectors are separated by a gap proximate the peg of the near-field transducer and each include a hypotenuse that faces the near-field transducer. The method may further involve energizing 904 a magnetic write pole to apply change a magnetic orientation at the hot spot. In such a case, the method may further involve shifting 905 the hotspot towards the write pole via a bevel of the peg, the bevel facing away from the write pole.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus, comprising:
   a near-field transducer comprising an enlarged portion with a peg extending from the enlarged portion towards a media-facing surface, wherein an end of the peg faces the media-facing surface and an end of the enlarged portion opposed to the pea terminates a first distance away from the media surface;
   two reflectors located co-planar with near-field transducer and located on either side of the near-field transducer in a crosstrack direction, the two reflectors being separated by a gap proximate the peg of the near-field transducer, the two reflectors each comprising:
      a first edge at the media facing surface; and
      a second flat edge at an acute angle to the media-facing surface, the second flat edge facing the near-field transducer, wherein a portion of the reflector near an intersection of the first and second edges is located between the end of the peg and the media-facing surface, the second flat edge terminating away from the intersection at a second distance from the media-facing surface that is less that the first distance of the near-field transducer; and
   a waveguide coupling light to the near-field transducer to form a hot spot on a recording medium, the two reflectors concentrating the light on the peg of the near-field transducer.

2. The apparatus of claim 1, wherein the end of the peg facing the media-facing surface comprises a bevel at a second acute angle to the media facing surface, the bevel facing a downtrack direction and resulting in the peg having a first downtrack thickness at the end that is less than a second downtrack thickness of the peg facing the enlarged portion.

3. The apparatus of claim 2, wherein the bevel shifts the hotspot towards a write pole of the apparatus.

4. The apparatus of claim 1, wherein the gap as a crosstrack dimension approximately equal to half that of the peg.

5. The apparatus of claim 1, further comprising an optical shield downtrack from the near-field transducer and the reflectors, the optical shield having a first edge proximate the media-facing surface.

6. The apparatus of claim 5, wherein the waveguide comprises a channel waveguide extending towards a second edge of the optical shield, the second edge facing away from the first edge.

7. The apparatus of claim 5, wherein the optical shield comprises a slanted surface that faces the enlarged portion of the near-field transducer, the slanted surface increasing a downtrack distance between the optical shield and the near-field transducer away from the media-facing surface.

8. The apparatus of claim 1, wherein the reflectors taper electromagnetic energy to a region just below the peg.

9. The apparatus of claim 1, wherein an outline of the enlarged portion comprises an elongated rectangle with rounded ends.

10. The apparatus of claim 1, wherein the waveguide couples the light to the near-field transducer in a fundamental, transverse magnetic mode.

11. An apparatus, comprising:
   a near-field transducer comprising an enlarged portion with a peg extending from the enlarged portion towards a media-facing surface, wherein an end of the peg faces the media-facing surface and an end of the enlarged portion opposed to the peg terminates a first distance away from the media surface;
   two triangular reflectors located on either side of the near-field transducer in a crosstrack direction, the two reflectors being separated by a gap proximate the peg of the near-field transducer, the two triangular reflectors each comprising a flat hypotenuse that faces the near-field transducer and an edge aligned with the media-facing surface, a portion of each reflector at an intersection between the edge and the flat hypotenuse being located between the end of the peg and the media-facing surface, the flat hypotenuse terminating away from the intersection at a second distance away from the media-facing surface that is less that the first distance of the near-field transducer;
   a write pole located downtrack from the near-field transducer;
   an optical shield located downtrack from the near-field transducer, the optical shield comprising a slanted surface that faces the near-field transducer and increases a downtrack distance between the optical shield and the near-field transducer away from the media-facing surface; and
   a channel waveguide extending to the optical shield, the channel waveguide coupling light to the near-field transducer to form a hot spot on a recording medium, the two reflectors concentrating the light on the peg of the near-field transducer.

12. The apparatus of claim 11, wherein the end of the peg facing the media-facing surface comprises a bevel at a second acute angle to the media facing surface, the bevel facing away from the write pole in a downtrack direction and resulting in the peg having a first downtrack thickness at the end that is less than a second downtrack thickness of the pea facing the enlarged portion.

13. The apparatus of claim 12, wherein the bevel shifts the hotspot towards the write pole.

14. The apparatus of claim 11, wherein the reflectors taper, electromagnetic energy to a region just below the peg.

15. The apparatus of claim 11, wherein an outline of the enlarged portion comprises an elongated rectangle with rounded ends.

16. The apparatus of claim 9, wherein the waveguide couples the light to the near-field transducer in a fundamental, transverse magnetic mode.

17. A method comprising:
   directing light through a channel waveguide of a read/write head, the light being coupled to a near-field transducer at a media-facing surface of the read/write head, the near-field transducer comprising a peg that directs surface plasmons from the media-facing surface to heat a recording medium, wherein an end of the peg faces the media-facing surface and an end of the enlarged portion opposed to the peg terminates a first distance away from the media surface;
   blocking stray light from leaving the media-facing surface via an optical shield located downtrack of the near-field transducer; and
   reflecting light to the peg via two triangular reflectors located on either side of the near-field transducer in a crosstrack direction, the two reflectors separated by a gap proximate the peg of the near-field transducer, the two triangular reflectors each comprising a flat hypotenuse that faces the near-field transducer and an edge aligned with the media-facing surface, a portion of each reflector at an intersection between the edge and the flat hypotenuse being located between the end of the peg and the media-facing surface, the flat hypotenuse terminating away from the intersection at a second distance away from the media-facing surface that is less that the first distance of the near-field transducer.

18. The method of claim 17, further comprising energizing a magnetic write pole to apply change a magnetic orientation at the hot spot.

19. The method of claim 18, further comprising shifting the hotspot towards the write pole via a bevel at the end of the peg, the bevel facing away from the write pole and resulting in the peg having a first downtrack thickness at the end that is less than a second downtrack thickness of the peg facing the enlarged portion.

20. The method of claim 17, wherein the channel waveguide couples the light to the near-field transducer in a fundamental, transverse magnetic mode.

* * * * *